US011232583B2

(12) United States Patent
Narasimha

(10) Patent No.: US 11,232,583 B2
(45) Date of Patent: Jan. 25, 2022

(54) DEVICE FOR AND METHOD OF DETERMINING A POSE OF A CAMERA

(71) Applicant: Rajesh Narasimha, Plano, TX (US)

(72) Inventor: Rajesh Narasimha, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 887 days.

(21) Appl. No.: 15/081,130

(22) Filed: Mar. 25, 2016

(65) Prior Publication Data
US 2017/0278231 A1 Sep. 28, 2017

(51) Int. Cl.
G06T 7/73 (2017.01)
G06T 7/246 (2017.01)
G06T 7/277 (2017.01)
G06T 7/55 (2017.01)
H04N 5/232 (2006.01)

(52) U.S. Cl.
CPC ............. G06T 7/73 (2017.01); G06T 7/246 (2017.01); G06T 7/277 (2017.01); G06T 7/55 (2017.01); G06T 2207/30244 (2013.01); H04N 5/23222 (2013.01)

(58) Field of Classification Search
None
See application file for complete search history.

(56) References Cited

U.S. PATENT DOCUMENTS 8,401,242 B2 * 3/2013 Newcombe ............. G06T 7/251
382/107
8,761,439 B1 * 6/2014 Kumar ...................... G06T 7/73
382/103
2005/0182518 A1 8/2005 Karlsson
2007/0253618 A1 * 11/2007 Kim .......................... G06T 7/80
382/154
2009/0248304 A1 * 10/2009 Roumeliotis .......... G01C 21/16
701/500
2010/0232727 A1 * 9/2010 Engedal ............... H04N 13/204
382/285
2012/0194644 A1 * 8/2012 Newcombe ............. G06T 7/20
348/46
2012/0206596 A1 8/2012 Samarasekera et al.
2012/0306876 A1 * 12/2012 Shotton ................... G06T 7/251
345/424
2013/0218461 A1 * 8/2013 Naimark ............... G01C 21/165
701/505
2013/0266180 A1 10/2013 Jin
(Continued)

FOREIGN PATENT DOCUMENTS

KR 10-1462007 11/2014
KR 1020150096922 8/2015

OTHER PUBLICATIONS

"Gravity-aware handheld Augmented Reality" (Year: 2011).*
(Continued)

Primary Examiner — Mohammed Jebari
(74) Attorney, Agent, or Firm — John J. King

(57) ABSTRACT

A method of determining a pose of a camera is described. The method comprises analyzing changes in an image detected by the camera using a plurality of sensors of the camera; determining if a pose of the camera is incorrect; determining which sensors of the plurality of sensors are providing the most reliable image data; and analyzing data from the sensors providing the most reliable image data.

29 Claims, 7 Drawing Sheets

(56) References Cited

U.S. PATENT DOCUMENTS

| | | | | |
|---|---|---|---|---|
| 2014/0104387 | A1* | 4/2014 | Klusza | H04N 13/271 348/46 |
| 2014/0369557 | A1 | 12/2014 | Kayombya et al. | |
| 2015/0094952 | A1* | 4/2015 | Moeglein | H04W 4/33 701/491 |
| 2015/0235367 | A1* | 8/2015 | Langer | H04N 7/18 348/135 |
| 2015/0235378 | A1 | 8/2015 | Rhee et al. | |
| 2015/0324636 | A1* | 11/2015 | Bentley | G11B 27/17 386/227 |
| 2016/0129593 | A1* | 5/2016 | Wolowelsky | B25J 5/00 700/253 |
| 2016/0364867 | A1* | 12/2016 | Moteki | G06T 7/73 |
| 2016/0379092 | A1* | 12/2016 | Kutliroff | G01C 21/3833 382/158 |
| 2017/0018086 | A1* | 1/2017 | Zhang | H04N 13/204 |
| 2017/0094245 | A1* | 3/2017 | Barakat | H04N 13/204 |
| 2017/0280129 | A1* | 9/2017 | Mirota | G06T 7/70 |

OTHER PUBLICATIONS

"Handheld Augmented Reality involving gravity measurements" (Year: 2012).*
"Sensor-Aided Visual Camera Localization and Tracking for Handheld Augmented Reality" (Year: 2014).*
Garcia et al. "Indoor SLAM for Micro Aerial Vehicles Control using Monocular Camera and Sensor Fusion" (Year: 2016).*
Nützi et al. "Fusion of IMU and Vision for Absolute Scale Estimation in Monocular SLAM" (Year: 2010).*
Ribo et al. "A Flexible Software Architecture for Hybrid Tracking" (Year: 2004).*
Leutenegger et al., Keyframe-Based Visual-Inertial SLAM Using Nonlinear Optimization, published Jun. 24-28, 2013.
Notification of Transmittal of International Search Report and the Written Opinion of the ISA in corresponding PCT Application No. PCT/KR2016/012839, dated Feb. 9, 2017.
Communication in co-pending EPO Application No. 16 895 605.0, dated Sep. 30, 2020.

* cited by examiner

DEVICE FOR AND METHOD OF DETERMINING A POSE OF A CAMERA

FIELD OF THE INVENTION

An embodiment of the invention relates generally to image processing, computer vision and robotics devices, and in particular, to a device for and a method of determining a pose of a camera.

BACKGROUND OF THE INVENTION

Digital image processing has become very commonly used and is important in many fields. Digital image processing acquires an image from a sensor and transforms the image to viewable content. However, there are many challenges when collecting digital images for particular applications that depend upon use of the image, such as multi-sensor digital processing. Multi-sensor digital processing, such as computer vision or simultaneous localization and mapping (SLAM) as used in robotics or on drones, is also an important function of digital cameras or 3-dimensional (3D) image processing systems. When implementing frame-to-frame tracking in computer vision, SLAM in robotics or on drones, or other 3D digital image tracking systems, the estimated camera pose may not be reliable for a number of reasons. The failure or delay in correcting camera pose when implementing computer vision or SLAM can result in the unnecessary use of resources or delay in generating desired data.

Accordingly, devices and methods that improve the detection of an error in camera pose and enable the relocalization of the camera while processing digital images are beneficial.

SUMMARY OF THE INVENTION

A method of determining a pose of a camera is described. The method comprises analyzing changes in an image detected by the camera using a plurality of sensors of the camera; determining if a pose of the camera is incorrect; determining which sensors of the plurality of sensors are providing reliable image data; and analyzing data from the sensors providing reliable image data.

Another method of determining a pose of a camera comprises storing color data, depth data, inertial measurement unit (IMU) and a motion prediction model output associated with frames captured by the camera; determining whether one or more of the color data, depth data, IMU, and a motion prediction model output indicate a pose failure; and correcting the pose of the camera by re-localization.

A further method of determining a pose of a camera comprises detecting changes in an image using a plurality of sensors of the camera, wherein the changes in the image indicate a pose failure; using color data and IMU to localize a pose of the camera to a nearest key frame; and using depth data to perform finer adjustments of the pose during re-localization.

A device for determining a pose of a camera is also described. The device comprises a processor configured to implement a plurality of sensors on the camera; analyze changes in images detected by the camera; determine if a pose of the camera is incorrect; and determine which sensors of the plurality of sensors are providing reliable image data.

A computer-readable storage medium having data stored therein representing software executable by a computer for determining a pose of a camera is also described. The computer-readable storage medium comprises instructions for implementing a plurality of sensors on the camera; instructions for analyzing changes in an image detected by the camera; instructions for determining if a pose of the camera is incorrect; and instructions for determining which sensors of the plurality of sensors are providing reliable image data.

Other features will be recognized from consideration of the Detailed Description and the Claims, which follow.

DETAILED DESCRIPTION

Figure 1:
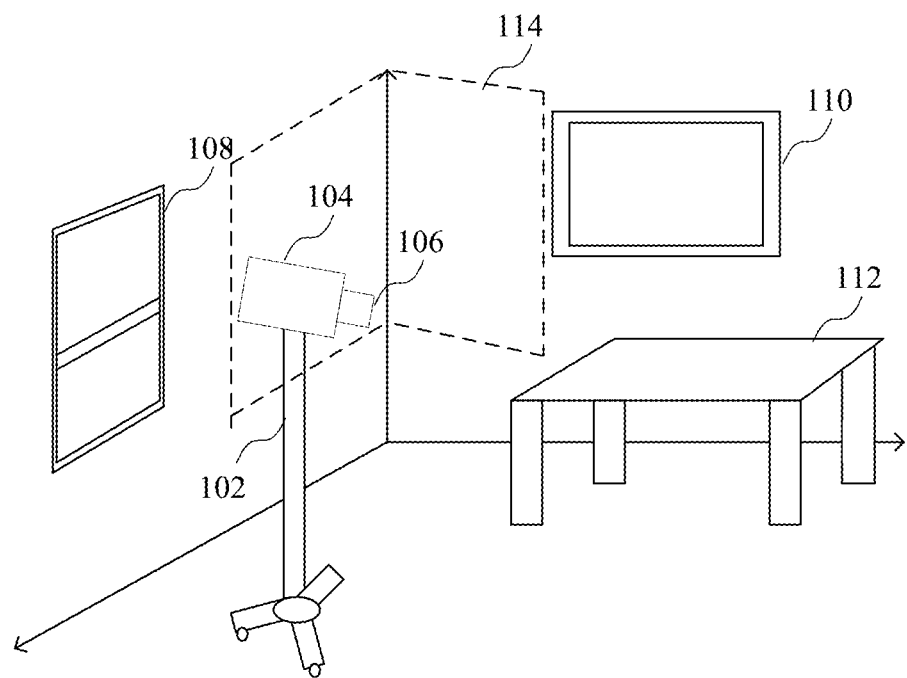
FIG. 1 is a diagram showing a 3D scene having various objects that are captured by a camera.

While the specification includes claims defining the features of one or more implementations of the invention that are regarded as novel, it is believed that the circuits and methods will be better understood from a consideration of the description in conjunction with the drawings. While various circuits and methods are disclosed, it is to be understood that the circuits and methods are merely exemplary of the inventive arrangements, which can be embodied in various forms. Therefore, specific structural and functional details disclosed within this specification are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting, but rather to provide an understandable description of the circuits and methods.

The methods and devices set forth below provide camera pose failure detection and re-localization of a camera using a sensor fusion approach, and includes a user interface to enable re-localization. When performing frame-to-frame tracking in computer vision or SLAM systems, the estimated camera pose may not be reliable. For example, the number of features in a scene may be too low to obtain a good camera pose estimate, such as due to flat regions (e.g. a wall), poor lighting, motion blur/focus issues, or fast camera motion or motion caused by handshake. Extreme cases include a camera that is obstructed or a camera that is dropped. In these scenarios, the camera has to re-localize itself to the previously seen landmarks or a 3D map that has been stored in order to continue from where the tracking was lost. Otherwise, it is necessary to re-start the feature tracking or matching function, which results in inconvenience to the user of the 3D tracking system. Avoiding re-starting the tracking process is particularly important with platforms equipped with 3D sensors, or in scenarios where the system is tracking and mapping a large area such as a building.

In addition to selectively choosing sensors of a plurality of sensor data that work together, particular sensor data can be used for particular purposes. For example, red-green-blue (RGB) image data and IMU captured by a camera can be used to localize a frame to a nearest key-frame, and the depth data can then be used to perform finer adjustments to enable more precise re-localization. While RGB image data is described by way of example, it should be understood that other type of black and white or color data could be implemented. An Inertial Measurement Unit (IMU) assists in cases where tracking based upon an RGB camera fails due to a reduced number of features or during fast motion scenarios. This fusion technique improves the accuracy in unconstrained environments, such as when there are few objects available as feature points. Computational intensive algorithms, such as an iterative closet point (ICP) algorithm, can be selectively used, such as for fined tuning only. The selective use of computational intensive algorithms reduces the memory bandwidth and reduces processing power while improving user experience. An edge map of the foreground silhouette from the last key-frame can also be used to align with an object for fast snapping to provide the user with an intuitive experience to re-localize the camera in a power efficient manner. That is, guides on the user interface speed up re-localization, which is therefore more efficient. A user interface that guides the user to perform re-localization using sensor fusion techniques based upon an RGB camera, a depth sensor and an IMU that work together can also be implemented to enable handling challenging tracking situations.

Turning first to FIG. 1, a diagram shows a 3D scene having various objects that are captured by a camera. The 3D scene of FIG. 1 includes a 3D tracking system 102 having a camera 104 that has one or more sensors 106, as will be described in more detail below. The 3D scene also includes a number of objects, including a window 108, a picture 110, a table 112, and a corner area 114 having no distinguishing objects. The 3D scene is provided by way of example to describe features of the devices and methods for determining pose of a camera. However, the device and methods can be implemented in any type of camera implementing a tracking or matching feature in any type of scene.

Figure 2:
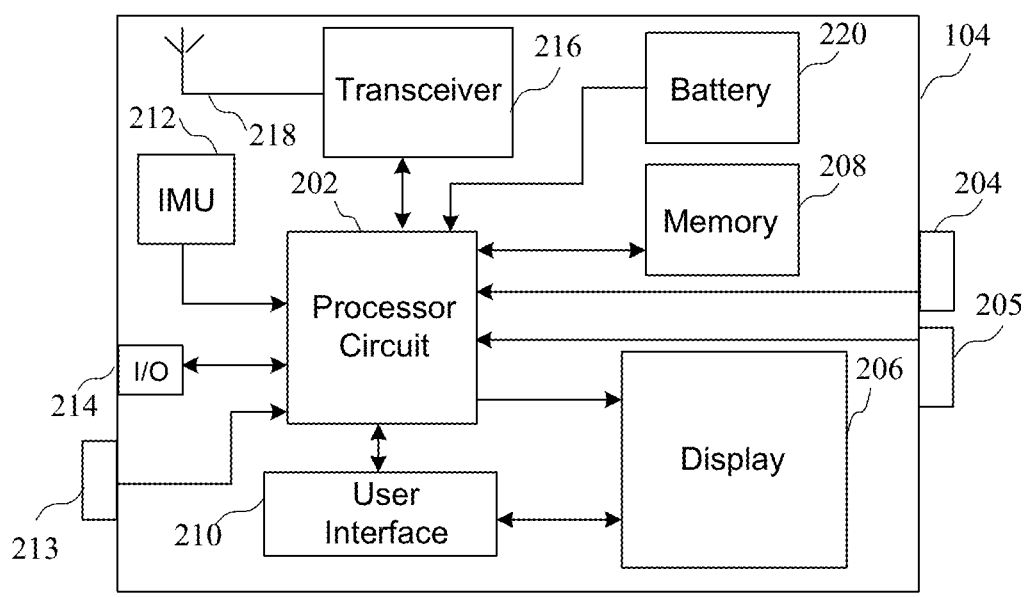
FIG. 2 is a block diagram of device for determining a pose of a camera.

Turning now to FIG. 2, a block diagram of device for determining a pose of a camera is shown. In particular, a camera 104 comprises a processor circuit 202 coupled to an image sensor 204. The camera 104 could be any type of device, or a component such as an integrated circuit of a device or system, adapted to capture a digital image. The image sensor 204 could be a digital camera, or any portion of a digital camera, such as a lens or other image sensing element. A second image sensor 205 could also be implemented, as will be described in more detail below. The processor circuit could be coupled to a display 206 for displaying a captured image, and more particularly, displaying frames of a 3D tracking application.

The processor circuit 202 may also be coupled to a memory 208 that enables storing information related to various frames of an image. The memory 208 could be implemented as a part of the processor circuit 202, or could be implemented in addition to any cache of the processor, as is well known. The processor circuit 202 also implements computer-readable code for determining the pose of a camera, where the computer-readable code may be stored on a memory of the camera 104, such as memory 205, or downloaded to the camera 104. A user interface 210, which may be separate from the display, or also may be a part of, or responsive to, the display, is also shown. The processor circuit 202 may also be coupled to other elements that receive inputs or enable the capturing of a digital image. For example, an inertial measurement unit (IMU) 212 can provide various information related to the motion or orientation of the camera 104. Another sensor 213, such as a thermal or temperature sensor could also be implemented. The processor circuit 202 may also receive input by way of an input/output (I/O) port 214 or a transceiver 216 coupled to an antenna 218. A battery 220 may be implemented to provide power to the processor and other elements of the camera 104. While particular sensors are shown in FIG. 2, it should be understood that other sensors enabling capturing a digital image could be employed.

Two aspects of the circuits and methods include the detection of camera pose failure and the re-localization of the camera which is tracking the subsequent frames to stored key frames until reliable features are obtained (and a key frame to which the incoming frame is localized is determined). The circuits and methods enable camera re-localization using a sensor fusion approach so that the feature tracking or matching can continue without any interruption once the features can be reliably tracked from where it was lost.

Figure 3:
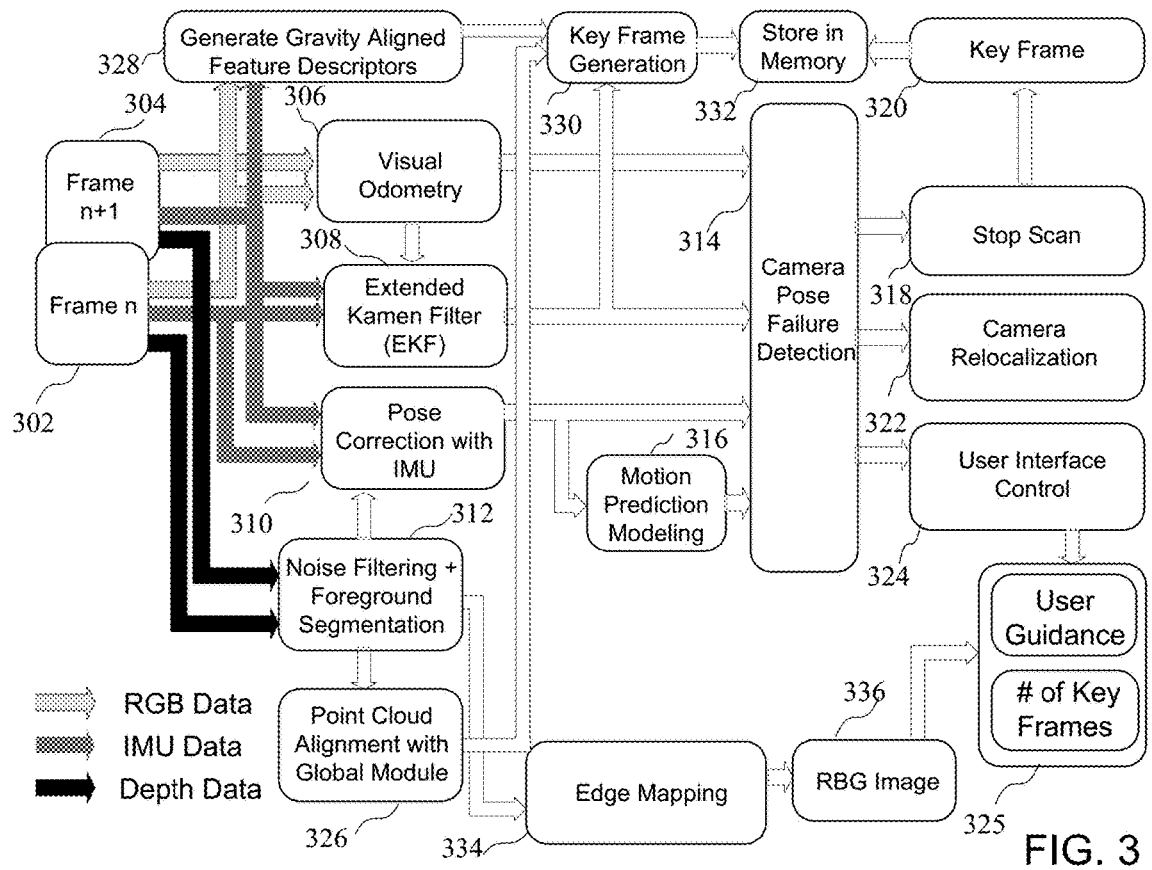
FIG. 3 is a diagram showing blocks for detecting a camera pose failure.

Turning now to FIG. 3, a diagram shows blocks for detecting a camera pose failure. A first frame 302, designated as Frame n, and a second frame 304, designated as Frame n+1, comprise different components including RGB data, IMU data, depth data, or other sensor data that are coupled to a plurality of processing blocks. The RGB data from each of the Frame n and Frame n+1 is provided to a visual odometry block 306. The IMU data, such as gyroscopic or accelerometer data, from each of the frames is provided to each of an Extended Kaman Filter (EKF) 308 and pose correction block 310. The Extended Kalman Filter 308 is used to fuse the pose from RGB feature tracking and IMU data. The pose correction block 310 corrects the pose of the camera based upon IMU data. Depth data associated with the frames are provided to a noise filtering and foreground segmentation block 312. The depth data enables the detection of contour in the 3D scene and can be used to identify objects based upon depth measurement at different points of the object. The depth data may be obtained by time of flight, structured sensor or doppler measurement using laser signals or other electronic waves, for example.

Signals generated by the visual odometry block 306, the extended Kaman filter (EKF) 308, and the pose correction block 310 are provided to a camera pose failure detection block 314. An output of the pose correction block 310 is coupled to motion prediction modelling block 316, a motion prediction model output of which is provided to the camera pose failure detection block 314. A motion prediction model is generated over time and provides an estimate of future motion based upon past motion. For example, as a camera advances through a scene, such as advancing down a hallway or near a corner of a room having mostly bare walls, the motion prediction model would indicate that the upcoming image would likely include bare walls. The motion prediction model can be one factor used to determine whether a current pose is not consistent with an expected pose, and therefore a camera pose failure is detected. A significant change of the motion of the camera and objects unexpectedly detected or disappearing in the scene can be used to determine that there is a camera pose failure.

The camera pose failure detection block 314 receives RGB frame, depth frame and Inertial Measurement Unit (IMU) outputs and selectively fuses them to detect a camera pose failure. The input to the camera pose failure detection logic block 314 consists of the visual odometry output, and IMU inputs that are fused using an extended Kalman filter, depth values, such as an ICP-based depth map aligned pose values, and values based upon a motion prediction model. If a failure is detected based upon one or more inputs to the camera pose failure detection block, it is determined that the camera pose has failed.

The RGB frames are used to detect features and then track those features in subsequent frames, or matches feature descriptors by constructing a descriptor around the feature point and match them across frames. Various methods for tracking frames can be implemented, such as a Lucas Kanade tracker (LKT), an oriented brief (ORB) tracker, or a KAZE tracker, for example. If the number of tracked features or matches is less than a specified statistic threshold value, which may be chosen by a user, or if a random sample consensus (RANSAC) algorithm or some other outlier detection method cannot detect enough inliers, the camera pose is determined to have failed. The thresholds can be set based on a statistic value (e.g. mean matches of n frames) for that scene or other criteria are found in literature so that it is adaptive to a given scene and can be changed based on a local windowed approach. A number of matches in every frame is computed and checked against this threshold to determine the confidence of the match. A two-dimensional (2D) pose obtained using the RGB frames localizes the camera in the world co-ordinates, which is also known as visual odometry (VO). The pose information is an input to the extended Kalman filter block 308 that fuses the 2D pose and the IMU outputs, such as outputs of a gyroscope and an accelerometer.

Additionally, a number of inliers from an inlier detection algorithm, such as the RANSAC algorithm, can also be used. If the number of matches is below the threshold value, a camera pose failure flag is set and the algorithm stops tracking to the previous frame. The camera then switches to matching the incoming frames to all the key frames so that a match can be found to resume the tracking/matching process. During this process the key frame buffer is not updated, and updating the reconstruction of the 3D model is also stopped in the case of a 3D scan. Tracking failures can also be detected based upon IMU data during fast motions using the gyroscope and accelerometer data. IMU data information can be fused into the visual odometry block using an extended Kalman filter to improve the detection of tracking failures.

The camera pose failure detection block 314 provides control signals to various processing blocks that perform functions associated with detecting a camera pose failure or performing camera re-localization. A control signal is provided to a stop scan block 318 to stop 3D scanning and key generation, and controls a key frame block 320 to store a last tracked frame as a key frame, as will be described in more detail below. The camera pose failure detection block 314 also controls a camera re-localization block 322, as shown and described in more detail in reference to FIG. 4.

A user interface control block 324 also receives control signals from the camera pose failure detection block 314 and controls a user interface 325. The user interface 325 provides various user guidance, such as prompts to a user of the camera to move the camera in a certain direction to effectively continue the 3D scanning operation. For example, the user interface may prompt a user of the camera to move the camera to the left. The user interface may also provide, in real time, an indication of the number of key frames that are stored.

The noise filtering and foreground segmentation block 312 controls a point cloud alignment block 326 which aligns frames with a global module. A point cloud identifies feature points associated with objects in a frame. The point cloud alignment block 326 enables key frame generation by a key frame generation block 330. The number of key frames is provided by the key frame generation block 330 to the user interface control block 324 so that the number of key frames can be displayed. The key frame generation block 330 also receives gravity aligned feature descriptors from a gravity aligned feature description block 328. That is, accelerometer readings are used to orient features based upon gravity, which is more generally robust than matching an image to features in RGB data. A motion prediction model is also built based on the history of the pose estimated from depth frames. As will be described in more detail below, the motion prediction model is used as an input in tracking the 3D image in certain situations. When performing key frame estimation while estimating camera pose, the incoming frame is tracked or matched against the previous frame. If the key frame generation circuit 330 determines that the rotation or translation for a frame is larger than a certain threshold, the frame is stored in a frame buffer and marked as a key frame as the camera pose estimation continues. A sparse map of the triangulated inlier points is also stored. The inlier points are representative of a frame and are strong matched locations with valid depths. Inlier points are invariant to illumination or rotation, for example. The descriptors that are stored for the key frames are gravity aligned based on the IMU and generated by the gravity aligned feature description block 328.

The noise filtering and foreground segmentation block 312 also controls an edge mapping block 334 to generate an edge mapping that is projected on an RGB image 336. The depth frames are filtered using a bilateral filter, and a foreground segmentation is performed on the depth frame. Foreground segmentation allows prominent objects in the foreground to be identified to enable alignment to other frames. Point cloud alignment using the object is then performed with a global model using an iterative closest point (ICP) algorithm, for example. A global model is a representative of objects that is updated every frame, where the incoming point cloud is merged every frame. For example, for the second frame, the first frame is the global model which is updated based upon the point cloud of the second frame. Therefore, the global model is matched with the incoming frame and then updated after matching. The pose is also corrected using IMU if needed, such as in cases of fast motion.

From the foreground segmentation, an edge map can be computed and projected onto the RGB frame. The edge map for the final key frame is stored. Once the detection is completed, the last tracked frame is stored as a key frame along with the edge map, the depth frame, feature descriptors, the pose computed after fusion from RGB tracking/matching, depth alignment, and the prediction model output.

When performing feature tracking or matching, a feature detection algorithm may fail due to number of reasons such as motion blur/hand shake, limited objects or features to compute reliable camera pose, camera obstruction, or the dropping of a camera, for example. In these scenarios, the camera has to be re-localized to the previously seen landmarks or a 3D map that is stored in order to continue from where it was lost. Otherwise, it is necessary to re-start the feature tracking or matching, which results in inconvenience to the user, particularly with platforms equipped with 3D sensors.

Figure 4:
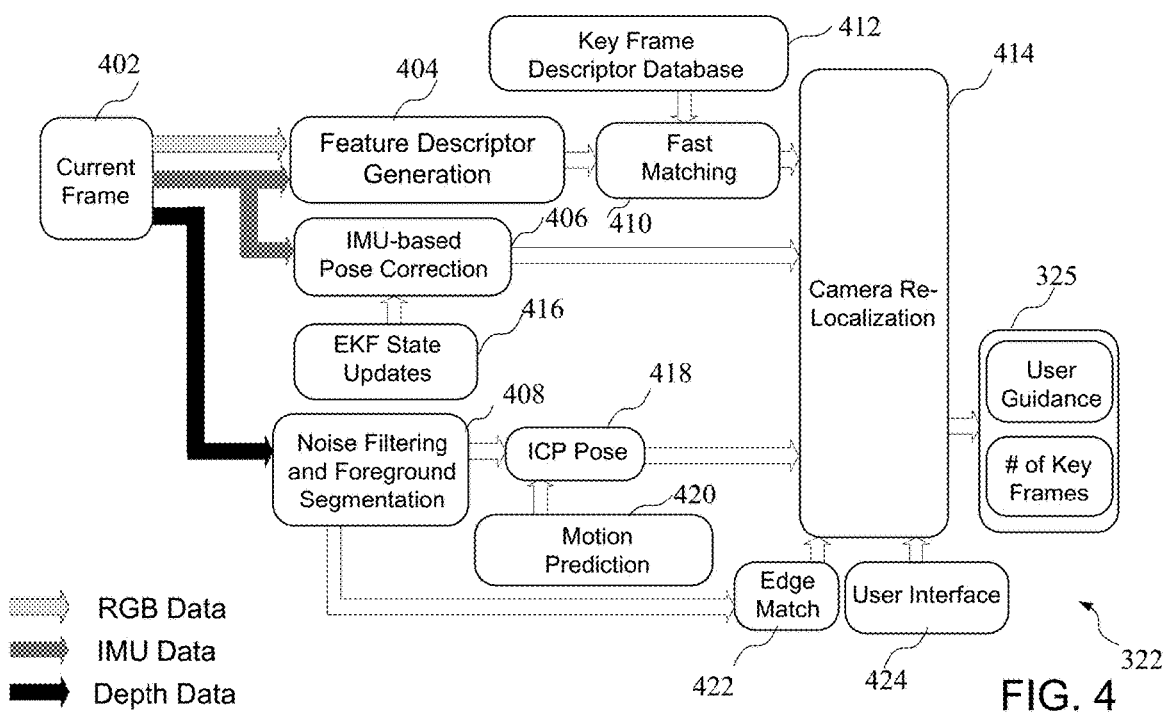
FIG. 4 is a diagram showing blocks for enabling re-localization of a camera capturing a 3D scene.

The diagram of FIG. 4 shows blocks for enabling re-localization of a camera capturing a 3D scene. The RGB data, IMU data and depth data is provide to various processing blocks to enable the re-localization of a camera during 3D scanning. More particularly, the RGB data associated with a current frame 402 is provided to a feature descriptor generation block 404, the IMU data is provided to an IMU-based pose correction block 406, and the depth data is provided to a noise filtering and foreground segmentation block 408. The feature descriptor generator 404 provides feature descriptors from an incoming frame to a fast matching block 410 that also receives key frame descriptors from a key frame descriptor database 412. The fast matching block 410 controls a camera re-localization block 414 by providing fast matching of a current frame to key frames. By way of example, the fast matching block could be implemented using hamming distances, which enables matching using two binary vectors. The IMU-based pose correction block 406 receives EFK state updates from an EFK state updates block 416, and also provides control signals to the camera re-localization block 414. The IMU-based pose correction block 406 provides a pose correction signal to the camera re-localization block 414, which corrects the pose of the camera based IMU data.

The noise filtering and foreground segmentation block 408 controls an ICP pose block 418 which also receives a motion prediction model output from a motion prediction block 420. The ICP pose block 418 matches the global model to an incoming frame using an iterative closest point algorithm and the motion prediction model. The noise filtering and foreground segmentation block 408 controls an edge match block 422 that enables re-localization by the camera re-localization block 414. The edge match block 422 determines whether edges of a foreground mask match stored edge maps, such as edge maps associated with key frames. The camera re-localization block 414 also receives user inputs from a user interface 424, and generates user interface information on the user interface 325. It should be noted that blocks of the camera relocalization block 322 shown in FIG. 4 having similar functionality as blocks in FIG. 3, and could use the similar blocks of FIG. 3. That is various functions described in reference to FIG. 4 could be implemented using blocks outside of the camera relocalization block 322. It should also be noted that the re-localization operation of FIG. 4 could be performed independent of the camera pose failure detection operation of FIG. 3.

During re-localization, the incoming frames (including RGB frame, depth frame and IMU data) are used, and more particularly used with a sensor fusion technique. The 2D features are used to match against the key-frames stored in the database. Alternatively, the EKF output (i.e. fused VO and IMU data) is used because the pose outputs are much stable then the raw 2D output. The depth data is filtered and the pose is used to re-localize. The edge map is also computed and used as a guidance via UI to enable the user to lock on to a stored edge map.

The following Table 1 shows a matrix of the re-localization use cases and the sensor reliability, and illustrates which sensor are reliable for four re-localization use cases. That is, the selection of sensor data can be based upon a type of problem associated with tracking of image frames and the reliability of the data when the type of problem is confronted.

TABLE 1

| | VO (RGB) | IMU | Motion Prediction Model | ICP (R&T) Variation |
|---|---|---|---|---|
| Camera Obstruction | Strong | Weak | Ok but not reliable | Weak |
| Camera in a New Scene | Ok but not reliable | Ok but not reliable | Strong | Strong |
| Motion Blur/Fast Movement | Weak | Strong | Ok but not reliable | Ok but not reliable |
| Camera Dropped | Strong | Strong | Strong | Strong |

For tracking to resume again the number of matches in the visual odometry should be greater than a statistical value (e.g. mean matches of n frames) for that scene for example. Once the incoming frame is localized to a specific key frame based on VO and IMU inputs, finer adjustments is performed using Iterative Closest Point (ICP). Because ICP is high in computational and memory resources, it should be performed only for finer adjustments (e.g., up to 5 frames) to provide a real-time user experience.

Figure 5:
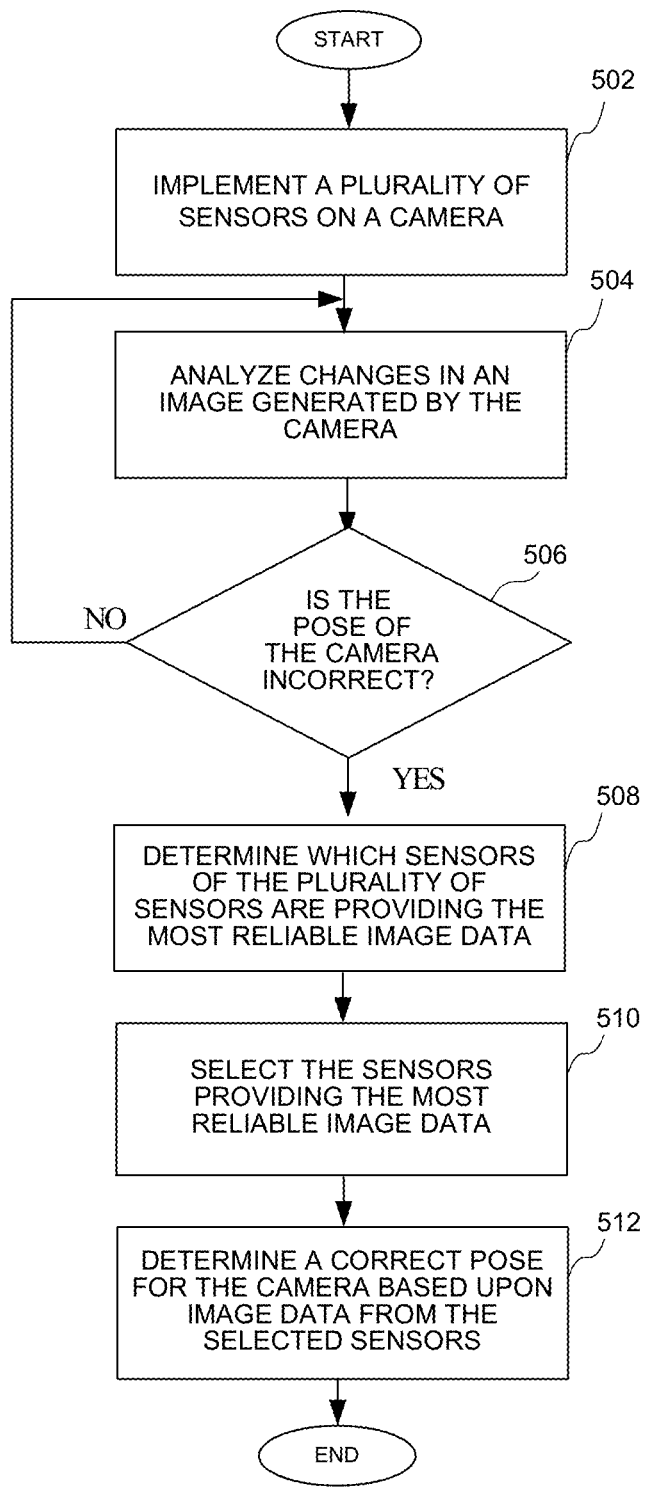
FIG. 5 is a flow chart showing a method of implementing a plurality of sensors associated with a camera for capturing a 3D scene.
Figure 6:
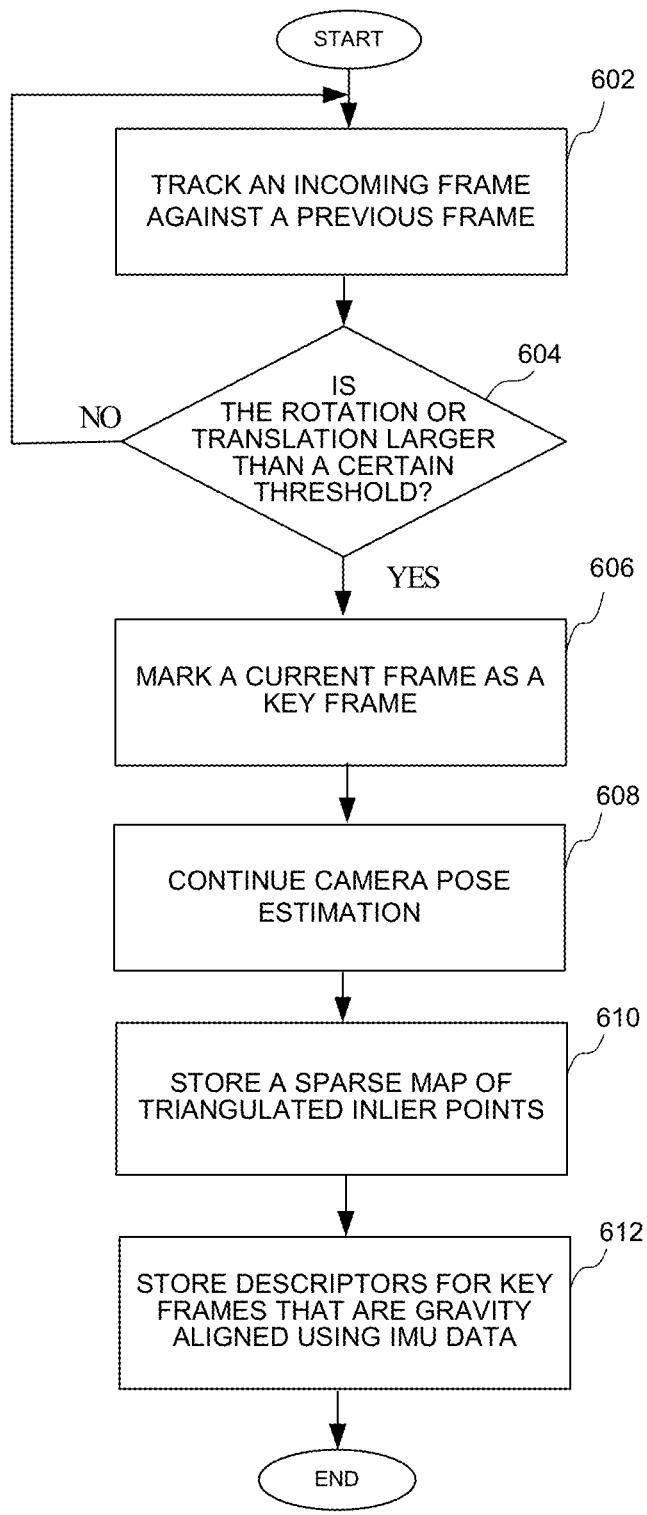
FIG. 6 is a flow chart showing a method of implementing key frame estimation in a camera for capturing a 3D scene.

Turning now to FIG. 5, a flow chart shows a method of implementing a plurality of sensors associated with a camera for capturing a 3D scene. A plurality of sensors on a camera are implemented at a block 502. Changes in an image generated by the camera are analyzed at a block 504. It is then determined if the pose of the camera is incorrect at a block 506. If so, sensors of the plurality of sensors which are providing reliable image data, and particularly the most reliable image data are determined at a block 508. The sensors providing reliable image data are selected at a block 510. A correct pose for the camera are determined based upon image data from the selected sensors at a block 512.

Using just a RGB camera limits the reliability of tracking since scenes with limited or no features or motion are unavoidable in unconstrained environments. Moreover, using just the depth camera may be too costly for processing and storing the 3D data if the re-localization is performed only using depth data. Only using IMU is unreliable since it provides noisy measurements. Therefore, selectively implementing these three sensors along with the implementation of a user interface provides a significant advantage. Each sensor will help the process in scenarios where the others fail. By way of example, when moving down a hallway during a scanning operation, the RGB data may be lost, and it may be necessary to rely upon IMU data until the RGB data is recovered. The image data could be evaluation based upon thresholds to determine whether certain data is reliable. Further, particular reliable data may be used based upon a type of problem associated with the tracking of image frames. That is, even if a greater number of reliable data inputs are available, reliable data associated with a particular problem may be selected to achieve the greatest likelihood that camera re-localization will occur quickly.

The following flow charts describe different methods associated with camera pose failure detection and camera re-localization. While specific elements of the flow charts are shown, it should be understood that additional or fewer elements of the methods could be performed according to various implementations. It should also be noted that additional details related to the various elements of the methods can be found in the description of FIGS. 1-5, which could be used to implement the various methods. Turning first to FIG.

6, a flow chart shows a method of implementing key frame estimation in a camera for capturing a 3D scene. An incoming frame is tracked against a previous frame at a block 602. It is then determined if the rotation or translation is larger than a certain threshold at a block 604. If so, a current frame is marked as a key frame at a block 606, and the camera pose estimation continues at a block 608. A sparse map of triangulated inlier points is stored at a block 610. Descriptors for key frames that are gravity aligned using IMU data are stored at a block 612. Storing and updating key frames is necessary to detect camera pose failures and perform camera pose re-localization.

Figure 7:
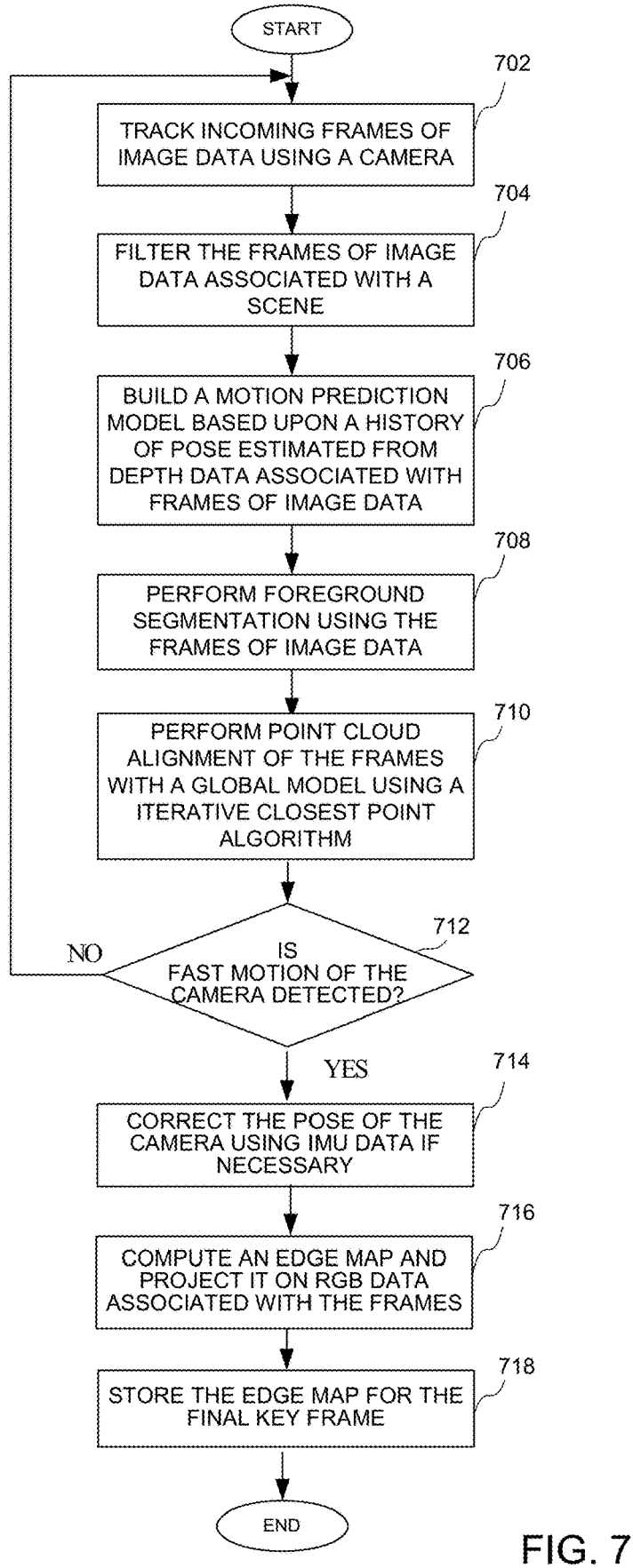
FIG. 7 is a flow chart showing another method of implementing key frame estimation in a camera for capturing a 3D scene.

Turning now to FIG. 7, a flow chart shows another method of implementing key frame estimation in a camera for capturing a 3D scene. Incoming frames of image data are tracked using a camera at a block 702. The frames of image data associated with a scene are filtered at a block 704. A motion prediction model is built based upon a history of pose estimated from depth data associated with frames at a block 706. Foreground segmentation is performed using the frames of image data at a block 708. Point cloud alignment of the frames with a global model is perform using an iterative closest point algorithm at a block 710. For example, objects within a certain distance from the camera, such as 0.5 meters (m) to 1.0 m, are considered to be in the foreground and can be easily used to generate objects that are easy to use for point cloud alignment. It is then determined if fast motion of the camera is detected at a block 712. If so, the pose of the camera is corrected using IMU data at a block 714. An edge map is computed and projected on RGB data associated with the frames at a block 716. The edge map is stored for the final key frame at a block 718.

Figure 8:
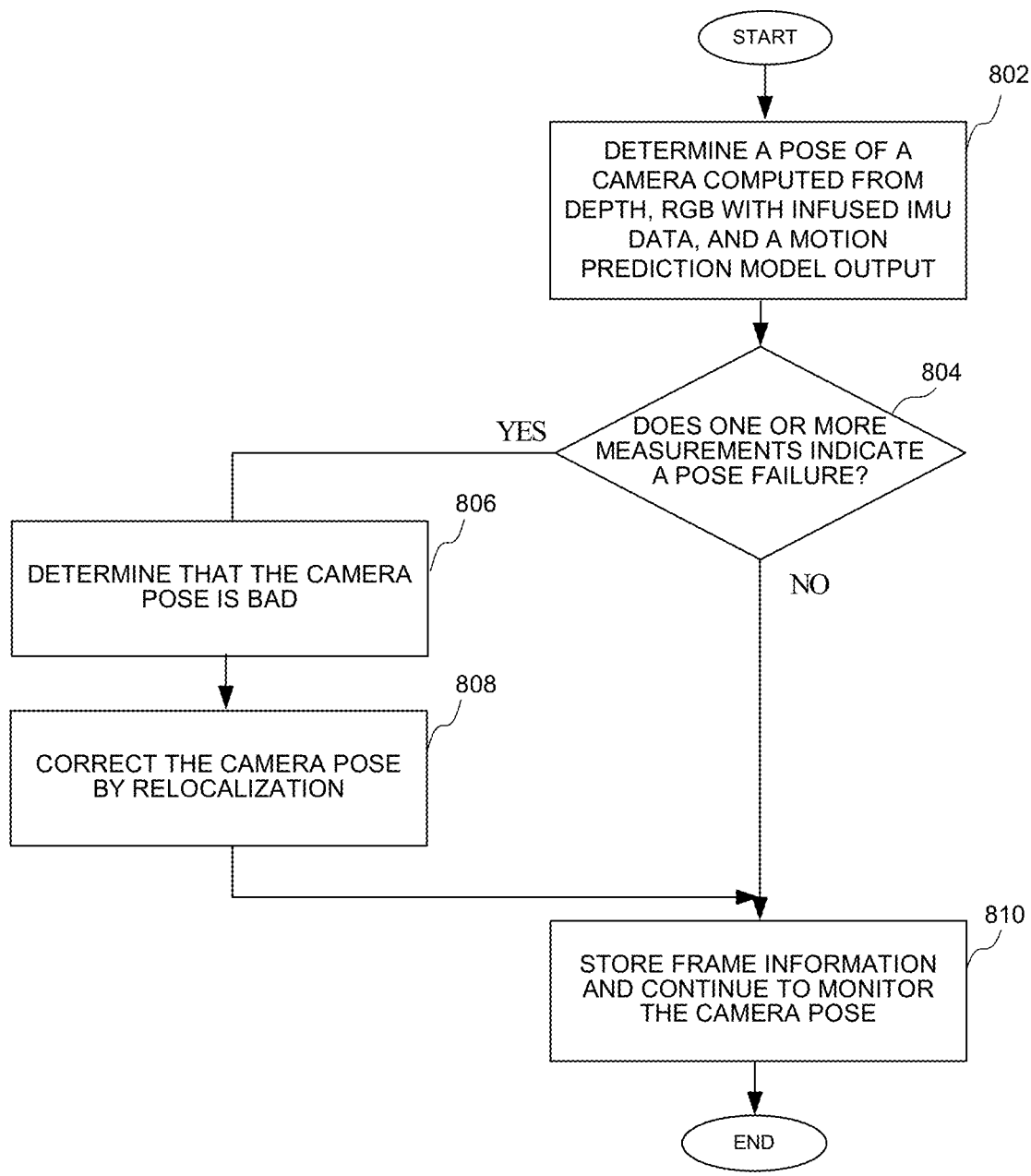
FIG. 8 is a flow chart showing a method of detecting camera pose failure using a plurality of different sensors.

Turning now to FIG. 8, a flow chart shows a method of detecting camera pose failure using a plurality of different sensors. A pose of a camera is determined from depth data, RGB data with infused IMU data, and a motion prediction model output at a block 802. It is then determined whether one or more measurements indicate a pose failure at a block 804. If so, it is determined that camera pose is bad at a block 806, and the camera pose is corrected by re-localization at a block 808. The re-localization can be performed as described above in reference to FIG. 4. Frame information is stored and montor camera pose is continued to be monitored at a block 810. The frame information could include any of the data captured or recorded by a sensor, as described above.

Figure 9:
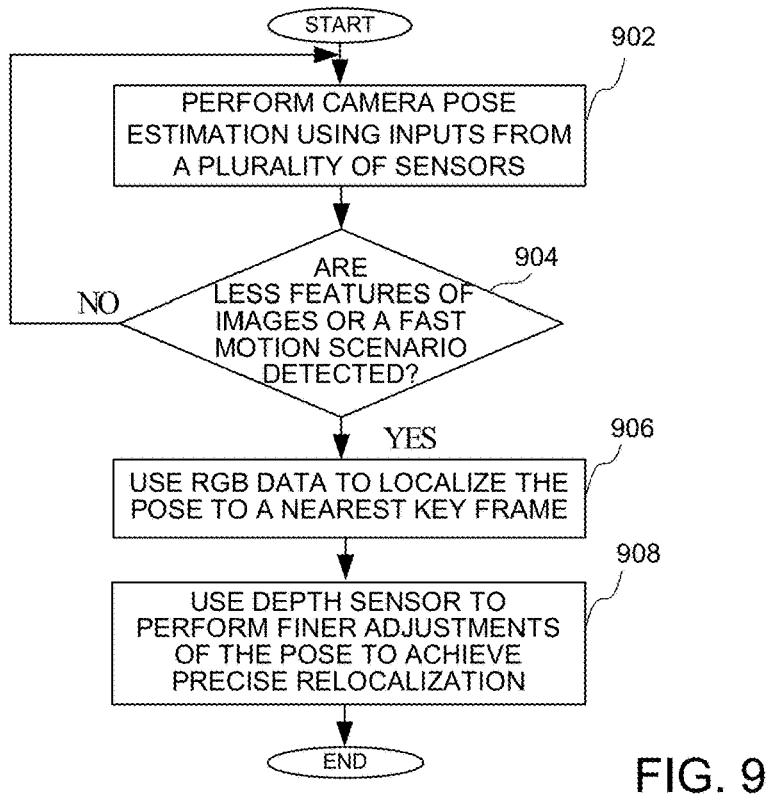
FIG. 9 is a flow chart showing a method of using different sensors for enabling different levels of camera re-localization.

Turning now to FIG. 9, a flow chart shows a method of using different sensors for enabling different levels of camera re-localization. Camera pose estimation is performed using inputs from a plurality of sensors at a block 902. It is determined whether less features of images or a fast motion scenario is detected at a block 904. RGB data is used to localize the pose to a nearest key frame at a block 906. A depth sensor is used to perform finer adjustments of the pose to achieve precise re-localization at a block 908. While specific examples are provided for using certain types of data for an initial matching and a fine adjustment, it should be understood that other selective use of sensor information could be implemented to enable efficient camera re-location.

Figure 10:
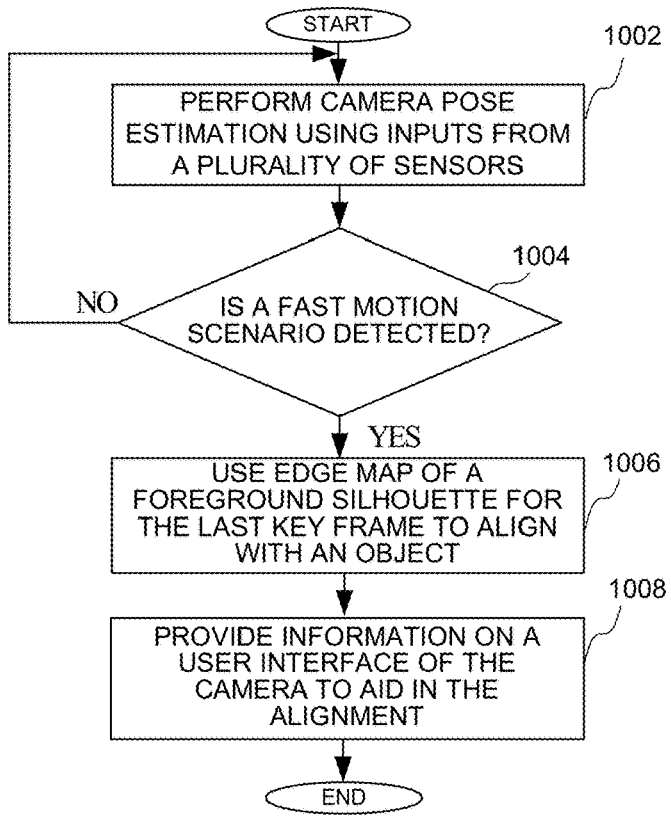
FIG. 10 is a flow chart showing a method of using an edge map to enable re-localization during fast motion.

Turning now to FIG. 10, a flow chart shows a method of using an edge map to enable re-localization during fast motion. Camera pose estimation is performed using inputs from a plurality of sensors at a block 1002. It is then determined whether a fast motion scenario is detected at a block 1004. If so, an edge map of a foreground silhouette is used for the last key frame to align with an object at a block 1006. Information is provided on a user interface of the camera to aid in the alignment at a block 1008.

It can therefore be appreciated that new to devices for and methods of determining pose of a camera have been described. It will be appreciated by those skilled in the art that numerous alternatives and equivalents will be seen to exist that incorporate the disclosed invention. As a result, the invention is not to be limited by the foregoing embodiments, but only by the following claims.

I claim:

1. A method of determining a pose of a camera, the method comprising:
    analyzing changes in a plurality of frames associated with an image detected by the camera to generate a first pose of the camera;
    using data related to rotation and translation motion of the camera to generate a second pose of the camera;
    generating an edge map that is stored for a key frame associated with the image;
    providing the first pose and the second pose to a filter to generate a filtered camera pose based upon the first pose of the camera associated with the image and the second pose of the camera associated with a motion of the camera;
    determining when a pose of the camera is incorrect using the filtered camera pose;
    determining which sensors of a plurality of sensors are providing reliable image data;
    analyzing data from the sensors providing reliable image data;
    performing re-localization using a matching of image data of a current frame to key frames and using the filtered camera pose, wherein the re-localization of the camera comprises storing key frames until reliable features are obtained and a key frame to which an incoming frame is localized is determined;
    performing a fine adjustment for re-localization using a current frame and depth data associated with the plurality of frames after performing re-localization using the filtered camera pose;
    updating an edge map for a last tracked frame using foreground segmentation during re-localization to identify objects in the foreground; and
    storing the last tracked frame as a key frame and the edge map during re-localization.

2. The method of claim 1 further comprising establishing a pose of the camera based upon the analyzed data from the sensors providing reliable image data.

3. The method of claim 1 wherein determining when a pose of the camera is incorrect comprises determining when a rotation or translation of the camera is larger than a certain threshold.

4. The method of claim 1 further comprising marking a current frame as a key frame after determining when a pose of the camera is incorrect.

5. The method of claim 4 further comprising storing descriptors for key frames that are gravity aligned using inertial measurement unit data for the key frame.

6. The method of claim 1 further comprising storing a sparse map of triangulated inlier points for key frames of the image.

7. A method of determining a pose of a camera, the method comprising:
    storing image data from the camera, depth data, and a motion prediction model output associated with frames captured by the camera;

generating an edge map that is stored for a key frame associated with the image;

generating a first pose of the camera using image data;

generating a second pose of the camera using data related to rotation and translation motion of the camera;

generating motion data using an inertial measurement unit;

correcting the second pose using the motion data generated by the inertial measurement unit;

determining whether one or more of the image data, the depth data, and the motion prediction model output indicate a pose failure;

correcting the pose of the camera by re-localization using a matching of image data of a current frame to key frames and using the corrected second pose, wherein the re-localization of the camera comprises storing key frames until reliable features are obtained and a key frame to which an incoming frame is localized is determined;

performing a fine adjustment for re-localization using a current frame and the depth data after performing re-localization using the corrected second pose;

updating an edge map for a last tracked frame using foreground segmentation during re-localization to identify objects in the foreground; and storing the last tracked frame as a key frame and the edge map during re-localization.

8. The method of claim 7 further comprising storing frame information and continuing to monitor camera pose after correcting the pose of the camera by re-localization.

9. The method of claim 7 further comprising storing a depth map and feature descriptors, wherein a global motion is updated using feature descriptors of incoming frames.

10. The method of claim 7 wherein correcting the pose of the camera by re-localization comprises computing a camera pose after fusion of the image data and the depth data.

11. The method of claim 7 further comprising updating a motion prediction model.

12. A method of determining a pose of a camera, the method comprising:

tracking rotation and translation motion of the camera;

performing camera pose estimation using inputs from a plurality of sensors;

detecting changes in an image based upon previous frames of the image using the camera, wherein the changes in the image indicate a pose failure;

generating an edge map that is stored for a key frame associated with the image;

identifying feature descriptors associated with a current frame;

using image data from the camera to localize a pose of the camera to a nearest key frame based upon the feature descriptors of the current frame;

performing re-localization using a matching of image data of a current frame to key frames and using the pose of the camera, wherein the re-localization of the camera comprises storing key frames until reliable features are obtained and a key frame to which an incoming frame is localized is determined;

determining a type of problem associated with tracking the image;

using depth data associated with a plurality of frames to perform finer adjustments of the pose using a current frame for re-localization after performing re-localization using the pose of the camera;

updating an edge map for a last tracked frame using foreground segmentation during re-localization to identify objects in the foreground; and storing the last tracked frame as a key frame and the edge map during re-localization.

13. The method of claim 12 wherein detecting changes in an image indicating a pose failure comprises detecting a reduced number of features of the image.

14. The method of claim 12 wherein detecting changes in an image indicating a pose failure comprises detecting fast motion.

15. The method of claim 12 wherein performing finer adjustments of the pose after performing re-localization comprises performing an iterative closest point calculation.

16. The method of claim 12 wherein performing camera pose estimation using inputs from a plurality of sensors comprises performing visual odometry.

17. The method of claim 16 further comprising fusing two-dimensional pose of the visual odometry with inertial measurement unit outputs.

18. A device for determining a pose of a camera, the device comprising:

a processor configured to:

implement a plurality of sensors on the camera;

analyze changes in a plurality of frames of an image detected by the camera to generate a first pose of the camera;

generate an edge map that is stored for a key frame associated with the image;

use data related to rotation and translation motion of the camera to generate a second pose of the camera;

provide the first pose and the second pose to a filter to generate a filtered camera pose based upon the first pose of the camera associated with the image and the second pose of the camera associated with a motion of the camera;

determine, using the filtered camera pose, when a pose of the camera is incorrect based upon the first pose and the filtered camera pose;

determine which sensors of the plurality of sensors are providing reliable image data;

perform re-localization using a matching of image data of a current frame to key frames and using the filtered camera pose, wherein the re-localization of the camera comprises storing key frames until reliable features are obtained and a key frame to which an incoming frame is localized is determined;

perform a fine adjustment for re-localization using a current frame and depth data associated with the plurality of frames after performing re-localization using the filtered camera pose;

update an edge map for a last tracked frame using foreground segmentation during re-localization to identify objects in the foreground; and store the last tracked frame as a key frame and the edge map during re-localization.

19. The device of claim 18 wherein the processor is further configured to analyze data from the sensors providing reliable image data.

20. The device of claim 19 wherein the processor is further configured to establish a pose for the camera based upon the analyzed data from the sensors providing reliable image data.

21. The device of claim 20 wherein the processor is further configured to determine when a rotation or translation of the camera is larger than a threshold value.

22. The device of claim 18 wherein the processor is further configured to store color data, the depth data, and a motion prediction model output associated with frames captured by the camera, and to determine whether one or more of the color data, the depth data, and the motion prediction model output indicates a pose failure.

23. The device of claim 18 wherein the processor is further configured to use color data to localize a pose of the camera to a nearest key frame, and to use depth data to perform finer adjustments of the pose to achieve precise re-localization.

24. A non-transitory computer-readable storage medium having data stored therein representing software executable by a computer for determining a pose of a camera, the non-transitory computer-readable storage medium comprising:
- instructions for implementing a plurality of sensors on the camera;
- instructions for analyzing changes in a plurality of frames of an image detected by the camera to generate a first pose of the camera;
- instructions for generating an edge map that is stored for a key frame associated with the image;
- instructions for using data related to rotation and translation motion of the camera to generate a second pose of the camera;
- instructions for providing the first pose and the second pose to a filter to generate a filtered camera pose based upon the first pose of the camera associated with the image and the second pose of the camera associated with a motion of the camera;
- instructions for determining, using the filtered camera pose, when a pose of the camera is incorrect;
- instructions for determining which sensors of the plurality of sensors are providing reliable image data;
- instructions for performing re-localization using a matching of image data of a current frame to key frames and using the filtered camera pose, wherein the re-localization of the camera comprises storing key frames until reliable features are obtained and a key frame to which an incoming frame is localized is determined;
- instructions for performing a fine adjustment for re-localization using a current frame and depth data associated with the plurality of frames after performing re-localization using the filtered camera pose;
- instructions for updating an edge map for a last tracked frame using foreground segmentation during re-localization to identify objects in the foreground; and
- instructions for storing the last tracked frame as a key frame and the edge map during re-localization.

25. The non-transitory computer-readable storage medium of claim 24 wherein the non-transitory computer-readable storage medium further comprises instructions for analyzing data from the sensors providing reliable image data.

26. The non-transitory computer-readable storage medium of claim 25 wherein the non-transitory computer-readable storage medium further comprises instructions for establishing a pose for the camera based upon the analyzed data from the sensors providing reliable image data.

27. The non-transitory computer-readable storage medium of claim 25 wherein the non-transitory computer-readable storage medium further comprises instructions for determining when a rotation or translation of the camera is larger than a threshold value.

28. The non-transitory computer-readable storage medium of claim 24 wherein the non-transitory computer-readable storage medium further comprises instructions for storing color data, the depth data, and a motion prediction model output associated with frames captured by the camera, and for determining whether one or more of the image data, the depth data, and the motion prediction model output indicates a pose failure.

29. The non-transitory computer-readable storage medium of claim 24 wherein the non-transitory computer-readable storage medium further comprises instructions for using color data to localize a pose of the camera to a nearest key frame, and using the depth data to perform finer adjustments of the pose to achieve precise re-localization.

* * * * *